(12) United States Patent
Wang et al.

(10) Patent No.: US 10,203,788 B2
(45) Date of Patent: Feb. 12, 2019

(54) ARRAY SUBSTRATE INCLUDING TOUCH ELECTRODE LINES OF DIFFERENT LAYERS, METHOD FOR MANUFACTURING THE SAME, AND TOUCH DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Wang, Beijing (CN); Shengji Yang, Beijing (CN); Xiaochuan Chen, Beijing (CN); Rui Xu, Beijing (CN); Pengcheng Lu, Beijing (CN); Changfeng Li, Beijing (CN); Zhenhua Lv, Beijing (CN); Xue Dong, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/302,994

(22) PCT Filed: Oct. 19, 2015

(86) PCT No.: PCT/CN2015/092199
§ 371 (c)(1),
(2) Date: Oct. 9, 2016

(87) PCT Pub. No.: WO2016/197501
PCT Pub. Date: Dec. 15, 2016

(65) Prior Publication Data
US 2017/0329442 A1    Nov. 16, 2017

(30) Foreign Application Priority Data
Jun. 10, 2015 (CN) .......................... 2015 1 0317116

(51) Int. Cl.
*G06F 3/041* (2006.01)
*G06F 3/044* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC .... G06F 3/044; G06F 3/0412; G02F 1/13338; G02F 1/134309; G02F 1/13439; G02F 1/136286; G02F 1/1368; G02F 1/133
(Continued)

(56) References Cited

U.S. PATENT DOCUMENTS

2010/0321326 A1    12/2010  Grunthaner et al.
2013/0162570 A1*   6/2013   Shin .................... G06F 3/044
                                                        345/173
(Continued)

FOREIGN PATENT DOCUMENTS

CN    102221754 A    10/2011
CN    102759999 A    10/2012
(Continued)

OTHER PUBLICATIONS

First Office Action for Chinese Application No. 201510317116.2, dated May 31, 2017, 13 Pages.
(Continued)

*Primary Examiner* — Adam J Snyder
(74) *Attorney, Agent, or Firm* — Brooks Kushman P.C.

(57) ABSTRACT

The present disclosure provides an array substrate, a method for manufacturing the same, and a touch display panel. The array substrate includes a transparent electrode and a plurality of touch electrode lines arranged on a base substrate. The transparent electrode includes a plurality of sub-elec-
(Continued)

trodes, and each of the plurality of sub-electrodes is connected with a respective one of the plurality of touch electrode lines. Each of the touch electrode lines includes a first touch electrode line and a second electrode line arranged in different layers, and projections of the first touch electrode line and the second touch electrode line on the substrate are overlapped with each other.

13 Claims, 4 Drawing Sheets

(51) Int. Cl.
  *G02F 1/1333*   (2006.01)
  *G02F 1/1343*   (2006.01)
  *G02F 1/1362*   (2006.01)
  *G02F 1/1368*   (2006.01)
  *G02F 1/133*   (2006.01)

(52) U.S. Cl.
  CPC .... *G02F 1/13439* (2013.01); *G02F 1/134309* (2013.01); *G02F 1/136286* (2013.01); *G06F 3/044* (2013.01); *G02F 1/133* (2013.01); *G02F 2201/121* (2013.01); *G02F 2201/123* (2013.01); *G06F 2203/04103* (2013.01)

(58) Field of Classification Search
  USPC .......................................... 345/173; 178/18.06
  See application file for complete search history.

(56) References Cited

U.S. PATENT DOCUMENTS

| | | | | |
|---|---|---|---|---|
| 2013/0257794 | A1* | 10/2013 | Lee | G06F 3/044 |
| | | | | 345/174 |
| 2014/0028616 | A1* | 1/2014 | Furutani | G06F 3/044 |
| | | | | 345/174 |
| 2014/0118639 | A1* | 5/2014 | Matsushima | G06F 3/044 |
| | | | | 349/12 |
| 2014/0168537 | A1* | 6/2014 | Han | G06F 3/044 |
| | | | | 349/12 |
| 2015/0185902 | A1 | 7/2015 | Liu et al. | |
| 2016/0246427 | A1* | 8/2016 | Ming | G06F 3/044 |
| 2016/0253023 | A1* | 9/2016 | Aoyama | G06F 3/044 |
| | | | | 345/174 |
| 2016/0291424 | A1* | 10/2016 | Sun | G06F 3/044 |
| 2016/0291741 | A1* | 10/2016 | Zhou | G06F 3/044 |
| 2016/0291775 | A1* | 10/2016 | Li | G06F 3/044 |
| 2016/0299612 | A1* | 10/2016 | Lu | G06F 3/044 |
| 2016/0306454 | A1 | 10/2016 | Wang et al. | |
| 2016/0342234 | A1 | 11/2016 | Xu | |

FOREIGN PATENT DOCUMENTS

| | | |
|---|---|---|
| CN | 203311375 U | 11/2013 |
| CN | 103926729 A | 7/2014 |
| CN | 104020910 A | 9/2014 |
| CN | 104317470 A | 1/2015 |
| CN | 204331654 U | 5/2015 |
| CN | 104915081 A | 9/2015 |

OTHER PUBLICATIONS

International Search Report and Written Opinion for Application No. PCT/CN2015/092199, dated Mar. 7, 2016, 12 Pages.
Second Office Action for Chinese Application No. 201510317116.2, dated Nov. 16, 2017, 15 Pages.

\* cited by examiner

ARRAY SUBSTRATE INCLUDING TOUCH ELECTRODE LINES OF DIFFERENT LAYERS, METHOD FOR MANUFACTURING THE SAME, AND TOUCH DISPLAY PANEL

CROSS-REFERENCE TO RELATED APPLICATIONS

This application is the U.S. national phase of PCT Application No. PCT/CN2015/092199 filed on Oct. 19, 2015, which claims priority to Chinese Patent Application No. 201510317116.2 filed on Jun. 10, 2015, the disclosures of which are incorporated in their entirety by reference herein.

TECHNICAL FIELD

The present disclosure relates to a technical field of touch display, and in particular relates to an array substrate, a method for manufacturing the array substrate, and a touch display panel.

BACKGROUND

With a rapid development of display techniques, the emergence of Touch Panel (abbreviated to "TP") makes peoples' life more convenient. Nowadays, an in-cell capacitive touch technique has been widely applied to a display field.

The in-cell capacitive touch technique can be divided into a self-inductance in-cell capacitive touch technique and a mutual-inductance in-cell capacitive touch technique. The self-inductance in-cell capacitive touch technique is advantageous over the mutual-inductance in-cell capacitive touch technique due to a high Signal to Noise Ratio (SNR) and low costs.

For the self-inductance in-cell capacitive touch technique, a touch electrode can have a fundamental touch performance only if a driving frequency for the touch electrode reaches a certain value. Additionally, a value of the driving frequency of the touch electrode is closely related with signal delays of a touch electrode line connected with the touch electrode.

SUMMARY

Embodiments of the present disclosure provide an array substrate, a method for manufacturing the array substrate, and a touch display panel, which may reduce signal delays and improve touch performance.

To achieve the above purpose, embodiments of the present disclosure provide the following technical solutions.

In one aspect, the present disclosure provides in some embodiments an array substrate which includes a transparent electrode and a plurality of touch electrode lines arranged on a base substrate. The transparent electrode includes a plurality of sub-electrodes, and each of the plurality of sub-electrodes is connected with a respective one of the plurality of touch electrode lines. Each of the touch electrode lines includes a first touch electrode line and a second touch electrode line arranged in different layers, and projections of the first touch electrode line and the second touch electrode line on the base substrate are overlapped with each other.

Optionally, the array substrate further includes a plurality of Thin Film Transistors (TFTs) and a plurality of pixel electrodes, and each of the plurality of pixel electrodes is connected with a drain electrode of a respective one of the plurality of the TFTs, and at a display stage, the plurality of sub-electrodes further function as a common electrode.

Further optionally, the first touch electrode line and a source electrode and the drain electrode of the one of the plurality of the TFTs are arranged in the same layer, or the first touch electrode line and a gate electrode of the one of the plurality of TFTs are arranged in the same layer.

Optionally, each of the first touch electrode line and the second touch electrode line includes a line portion and a convex portion connected with the line portion; each of the sub-electrodes is electrically connected with the first touch electrode line and/or the second touch electrode line through a via hole corresponding to the convex portion.

Optionally, both the first touch electrode line and the second touch electrode line are located in a non-light-transmissible region.

Optionally, each of the sub-electrodes corresponds to a respective one of the touch electrode lines in a one-to-one manner.

Optionally, the projections of the first touch electrode line and the second touch electrode line on the base substrate are partially or completely overlapped with each other.

Optionally, the first touch electrode line and the second touch electrode line in the respective one of the touch electrode lines corresponding to each of the sub-electrodes are electrically connected with each other directly, or are electrically connected with each other via the sub-electrode.

Optionally, the second touch electrode line is arranged between the first touch electrode line and a respective one of the plurality of sub-electrodes, and the one of the sub-electrodes is arranged away from the base substrate and the first touch electrode line is arranged close to the base substrate.

In another aspect, the present disclosure provides a touch display panel which includes the above array substrate.

In still another aspect, the present disclosure provides another touch display panel, which includes an array substrate and a second substrate that are oppositely arranged to form a cell. The array substrate includes a plurality of first touch electrode lines arranged on the a first base substrate, and the second substrate includes a transparent electrode and a plurality of second touch electrode lines arranged on a second base substrate. The transparent electrode includes a plurality of sub-electrodes, and each of the plurality of sub-electrodes is connected with a respective one of the second touch electrode lines. Each of the plurality of first touch electrode lines corresponds to a respective one of the plurality of second touch electrode lines in a one-to-one manner, and is connected to the one of the plurality of second touch electrode lines by conductive adhesive. Projections of the one of the plurality of first touch electrode lines and the one of the plurality of second touch electrode lines on the first base substrate are overlapped with each other.

Optionally, the array substrate further includes a plurality of TFTs and a plurality of pixel electrodes, and each of the plurality of pixel electrodes is connected with a drain electrode of a respective one of the plurality of TFTs, and at a display stage, the sub-electrodes further function as a common electrode.

Further optionally, the first touch electrode line and a source electrode and the drain electrode of the one of the TFTs are arranged in the same layer, or the first touch electrode line and a gate electrode of the one of the plurality of TFTs are arranged in the same layer.

Optionally, each of the plurality of second touch electrode lines includes a line portion and a convex portion connected with the line portion, and each of the plurality of sub-electrodes is electrically connected with a respective one of the plurality of second touch electrode lines through a via hole corresponding to the convex portion.

In yet another aspect, the present disclosure provides a method for manufacturing an array substrate, which includes forming a transparent electrode and a plurality of touch electrode lines on a base substrate. The transparent electrode includes a plurality of sub-electrodes, and each of the plurality of sub-electrodes is connected with a respective one of the plurality of touch electrode lines. Each of the touch electrode lines includes a first touch electrode line and a second touch electrode line arranged in different layers, and projections of the first touch electrode line and the second touch electrode line on the base substrate are overlapped with each other.

Optionally, the first touch electrode line and a source electrode and a drain electrode of a corresponding one of the plurality of TFTs are formed in a same patterning process, or the first touch electrode line and a gate electrode of the one of the plurality TFTs are formed in a same patterning process.

Optionally, each of the first touch electrode line and the second touch electrode line includes a line portion and a convex portion connected with the line portion; each of the sub-electrodes is electrically connected with the first touch electrode line and/or the second touch electrode line through a via hole corresponding to the convex portion.

In the array substrate, the method for manufacturing the array substrate and the touch display panel provided in the embodiments of the present disclosure, the first touch electrode line and the second touch electrode line are provided in parallel, such that a resistance of the touch electrode line consisting of the first touch electrode line 201 and the second touch electrode line 202 may be decreased, thereby reducing signal delays and improving the touch performance of the touch display panel.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

REFERENCE SIGNS

01—array substrate; 02—second substrate; 03—liquid crystal layer; 10—transparent electrode; 101—sub-electrode; 1011—slit; 20—touch electrode line; 201—first touch electrode line; 2011—line portion; 2012—convex portion; 202—second touch electrode line; 30—TFT; 40—pixel electrode

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
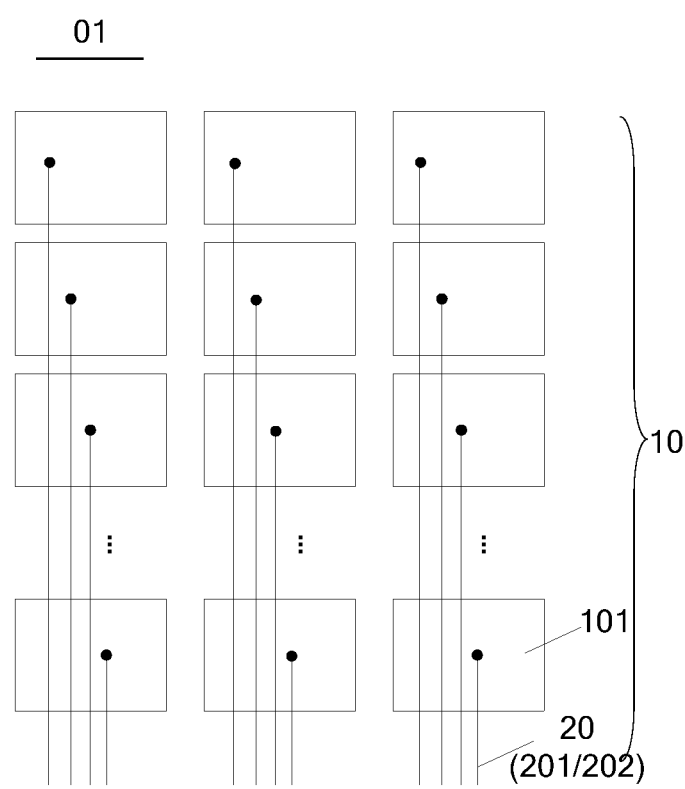
FIG. 1 is a first schematic top view of an array substrate provided in the embodiments of the present disclosure.
Figure 2:
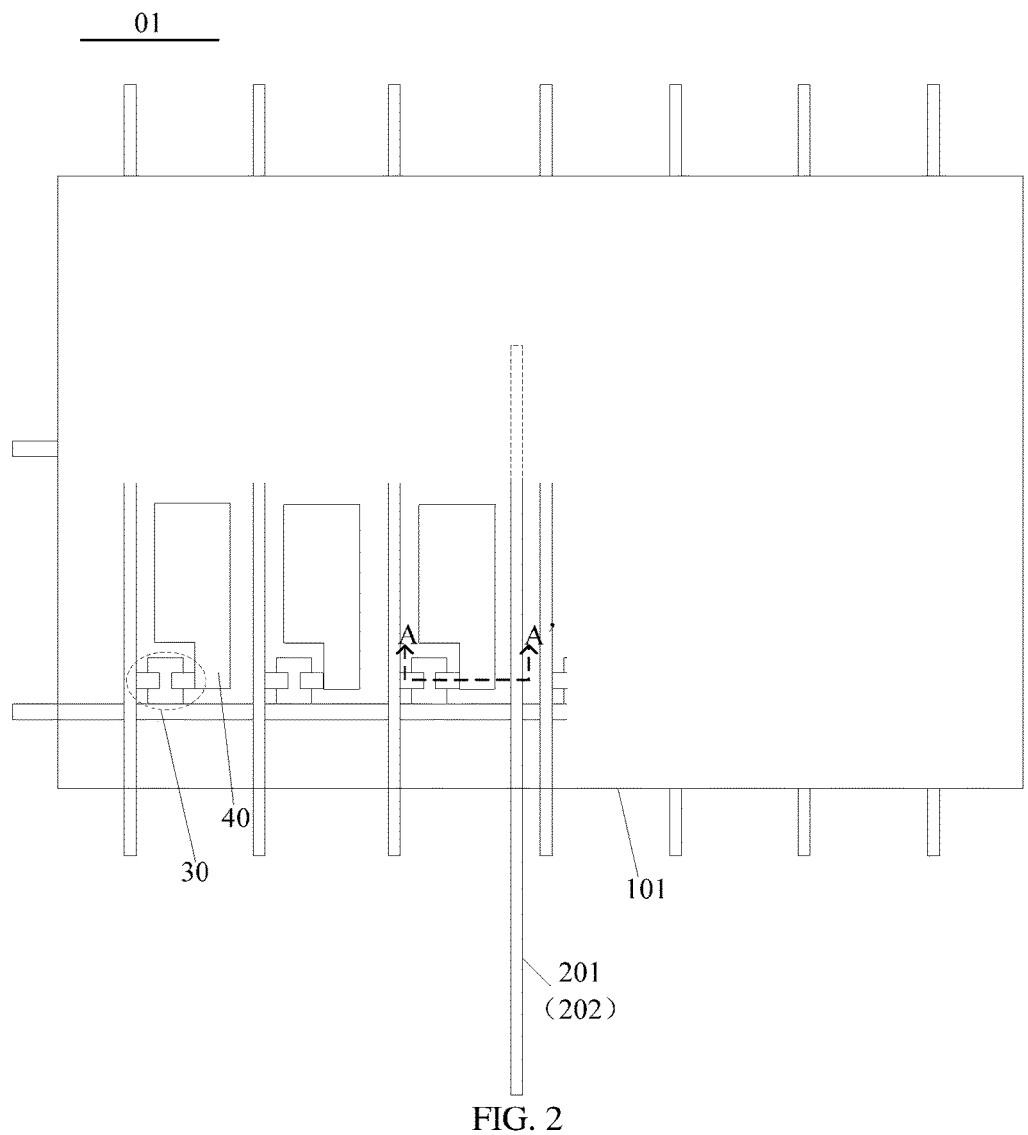
FIG. 2 is a second schematic top view of the array substrate provided in the embodiments of the present disclosure.

The embodiments of the present disclosure provide an array substrate 01. As shown in FIG. 1 and FIG. 2, the array substrate 01 includes a transparent electrode 10 and touch electrode lines 20 arranged on a base substrate. The transparent electrode 10 includes a plurality of sub-electrodes 101 which are connected with the touch electrode lines 20 respectively. Each of the touch electrode lines 20 includes a first touch electrode line 201 and a second touch electrode line 202 arranged in different layers, and projections of the first touch electrode line 201 and the second touch electrode line 202 on the base substrate are overlapped with each other.

It should be noted that, firstly, as known by a person skilled in the art, the array substrate 01 consists of a plurality of pixel units arranged in a matrix, and each of the pixel units includes at least three sub-pixel units. As shown in FIG. 2, each of the sub-pixel units includes a TFT 30 and a pixel electrode 40, wherein the TFT 30 includes a gate electrode, a gate insulation layer, an active layer, a source electrode and a drain electrode, and the pixel electrode 40 is electrically connected with the drain electrode.

In the case that the array substrate 01 is applied to a touch display panel, only a region where the pixel electrode 40 in each sub-pixel unit is located can transmit lights. That is, the region where the pixel electrode 40 is located is a light-transmissible region. In view of this, because the first touch electrode line 201 and the second touch electrode line 202 are generally formed of a metal material, the first touch electrode line 201 and the second touch electrode line 202 in the embodiments of the present disclosure are preferably arranged in a non-light-transmissible region, so as to increase an aperture ratio.

Secondly, each of the sub-electrodes 101 corresponds to a respective one of the touch electrode lines 20 in a one-to-one manner. That is, each of the sub-electrodes 101 corresponds to a respective one of the touch electrode lines 20 consisting of one first touch electrode line 201 and one second touch electrode line 202 in a one-to-one manner. A shape of each of the sub-electrodes 101 may be a rectangular, preferably a square. As shown in FIG. 2, each of the sub-electrodes 101 may correspond to a plurality of pixel units.

In the case that the array substrate 01 is applied to the touch display panel, sizes of the sub-electrodes 101 are different in the case that the touch display panel has a different size, which is not particularly defined herein. A length of a side of each square sub-electrode 101 in a touch display panel of being less than 6 inches may be between 3.5 mm-5 mm.

Thirdly, the projections of the first touch electrode line 201 and the second touch electrode line 202 on the base substrate may be partially or completely overlapped with each other, which is not particularly defined herein.

Additionally, the first touch electrode line 201 and the second touch electrode line 202 in the touch electrode line 20 corresponding to a respective one of the sub-electrodes 101 may be electrically connected with each other directly, or may be electrically connected with each other via the one of the sub-electrodes 101. That is, the first touch electrode line 201 and the second touch electrode line 202 may be electrically connected with each other through a via hole, and the one of the sub-electrodes 101 is electrically connected with the first touch electrode line 201 or the second touch electrode line 202 adjacent to the one of the sub-electrodes 101 through the via hole; or the one of the sub-electrodes 101 is electrically connected with both the first touch electrode line 201 and the second touch electrode line 202.

Fourthly, the substrate is not particularly defined, which may be a base substrate without any film layers formed thereon or a substrate with, for example, a buffer layer.

The embodiments of the present disclosure provide the array substrate 01, which includes the transparent electrode 10 and the touch electrode lines 20 arranged on the base substrate. The transparent electrode 10 includes a plurality of sub-electrodes 101 which are connected with the touch electrode lines 20 respectively. Each of the touch electrode lines 20 includes the first touch electrode line 201 and the second electrode line 202 arranged in different layers and electrically connected with each other, and the projections of the first touch electrode line 201 and the second touch electrode line 202 on the base substrate are overlapped with each other. By providing the first touch electrode line 201 and the second touch electrode line 202 in parallel, a resistance of the touch electrode line 20 consisting of the first touch electrode line 201 and the second touch electrode line 202 may be decreased, thereby reducing signal delays and improving a touch performance of the touch display panel.

Optionally, at a display stage, the sub-electrodes 101 further function as a common electrode. That is, at the display stage, the sub-electrodes 101 are the common electrode; and at a touch stage, the sub-electrodes 101 are touch electrodes. In this way, the number of patterning processes may be reduced.

In the present disclosure, the display stage indicates a time period during which an image display function is implemented when the array substrate 01 is applied to a touch display panel; and the touch stage indicates a time period during which a touch function is implemented when the array substrate 01 is applied to the touch display panel. In a specific operation, a time-division driving mode (i.e., the display stage and the touch stage are driven separately) is used to the sub-electrodes 101. That is, at the display stage, the sub-electrodes 101 function as the common electrode, and corresponding voltages for implementing the image display function are applied to the sub-electrodes 101 and the pixel electrodes 40 to achieve the image display function; and at the touch stage, the sub-electrodes 101 function as the touch electrodes, and corresponding voltages for implementing the touch function are applied to the sub-electrodes 101, and at the same time, the pixel electrodes 40 do not work to avoid affecting the touch function.

Figure 3:
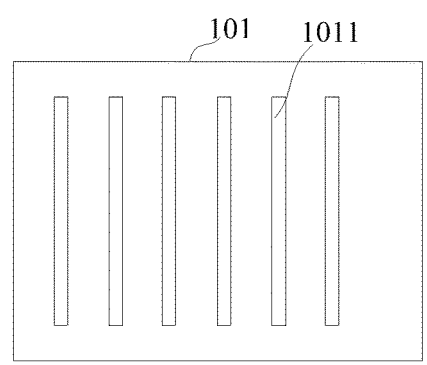
FIG. 3 is a structural schematic diagram of a sub-electrode provided in the embodiments of the present disclosure.

Based on the above, to implement normal display, the sub-electrode 101 or the pixel electrode 40 corresponding to one sub-pixel unit may be strip-like electrodes. For example, as shown in FIG. 3, when the sub-electrode 101 is located above the pixel electrode 40, the sub-electrode 101 is divided into a plurality of strip-like electrodes by a number of slits 1011. In this way, at the display stage, the strip-like sub-electrodes 101 in different planes and the plate-shaped pixel electrode 40 may generate a multi-dimensional electric field, and when the array substrate 01 is applied to the touch display panel, liquid crystal molecules in a liquid crystal layer may be caused to rotate, thereby implementing the image display function.

At the touch stage, the sub-electrodes 101 function as the touch electrodes. Under the influence of the electric field generated by a human body, when a user's finger touches the light emergent side of the touch display panel, a capacitance of one of the sub-electrodes 101 where the finger is located changes from a constant value before the touch to the constant value plus the capacitance of the finger. Thus, according to the changed capacitance at a position of the touch, the position of the touch may be obtained by calculation, thereby implementing the touch function.

Figure 4:
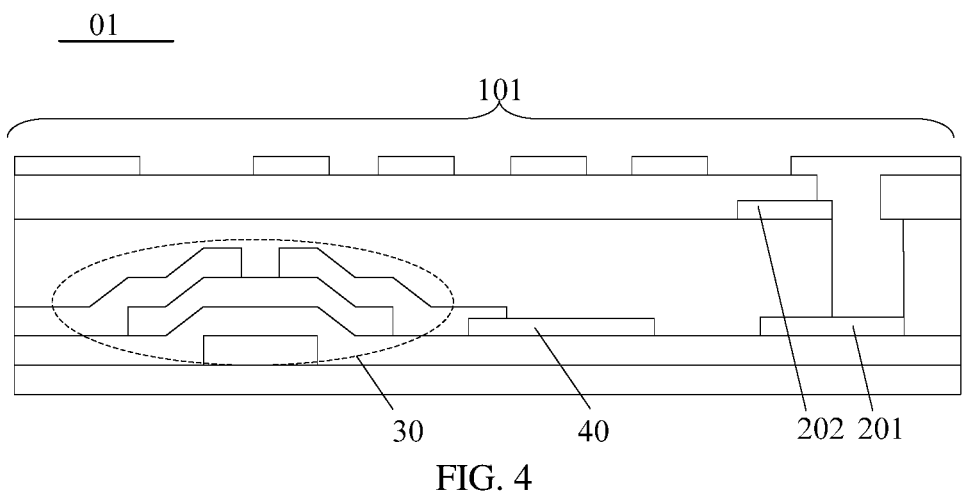
FIG. 4 is a schematic sectional view taken along a line A-A' in FIG. 2.

Optionally, as shown in FIG. 4, the first touch electrode line 201 and the source electrode and the drain electrode of the TFT are arranged in the same layer, or the first touch electrode line 201 and the gate electrode of the TFT are arranged in the same layer. Such arrangement may reduce the number of patterning processes.

That is, the first touch electrode line 201, the source electrode and the drain electrode may be formed by one patterning process, and a data line electrically connected with the source electrode may also be formed simultaneously, and the first touch electrode line 201 is parallel to the data line. Alternatively, the first touch electrode line 201 and the gate electrode may be formed by one patterning process, and a gate line electrically connected with the gate electrode may also be formed simultaneously, and the first touch electrode line 201 is parallel to the gate line.

Further, referring to FIG. 4, the second touch electrode line 202 may be arranged between the first touch electrode line 201 and the sub-electrode 101, and the sub-electrode 101 is arranged away from the base substrate and the first touch electrode line 201 is arranged close to the base substrate. The first touch electrode line 201, the second touch electrode line 202, and the sub-electrode 101 are electrically connected with each other through a via hole on an insulation layer.

Figure 5:
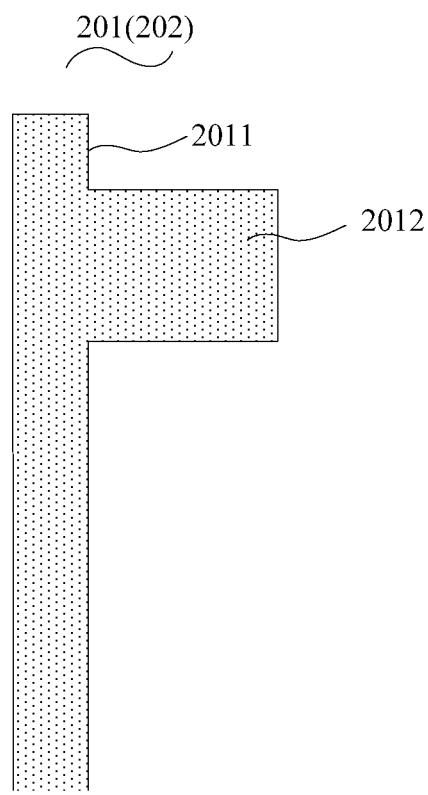
FIG. 5 is a structural schematic diagram of a first touch electrode line and a second touch electrode line provided in the embodiments of the present disclosure.

Optionally, as shown in FIG. 5, each of the first touch electrode line 201 and the second touch electrode line 202 includes a line portion 2011 and a convex portion 2012 connected with the line portion 2011, and the sub-electrode 101 is electrically connected with the first touch electrode line 201 and/or the second touch electrode line 202 through the via hole corresponding to the convex portion 2012.

Specifically, a first via hole corresponding to the convex portion 2012 may be arranged on a first insulation layer between the first touch electrode line 201 and the second touch electrode line 202, such that the convex portions 2012 of the first touch electrode line 201 and the second touch electrode line 202 are electrically connected with each other through the first via hole; and a second via hole corresponding to the convex portion 2012 may be arranged on a second insulation layer between the sub-electrode 101 and the second touch electrode line 202 close to the sub-electrode 101, such that the sub-electrode 101 and the convex portion 2012 of the second touch electrode line 202 are electrically connected with each other through the second via hole.

Optionally, a part of the convex portion 2012 of the first touch electrode line 201 is not covered by the convex portion 2012 of the second touch electrode line 202, and the first via hole corresponding to the part of the convex portion 2012 of the first touch electrode line 201 is arranged on the first insulation layer; and the second via hole corresponding to the convex portion 2012 of the second touch electrode line 202 is arranged on the second insulation layer, and the sub-electrode 101 is electrically with the convex portion 2012 of the first touch electrode line 201 and the convex portion 2012 of the second touch electrode 202 through the first via hole and the second via hole, respectively.

In the related arts, electrodes are typically connected by the lines only, a width of the lines 2011 is generally narrow, and thus an electrical connection may not be implemented through a via hole sometimes. In contrast, in the embodiments of the present disclosure, the electrical connection may always be implemented by providing the convex portion 2012 connected with the line portion 2011 and arranging the via hole above the convex portion 2012.

Figure 6:
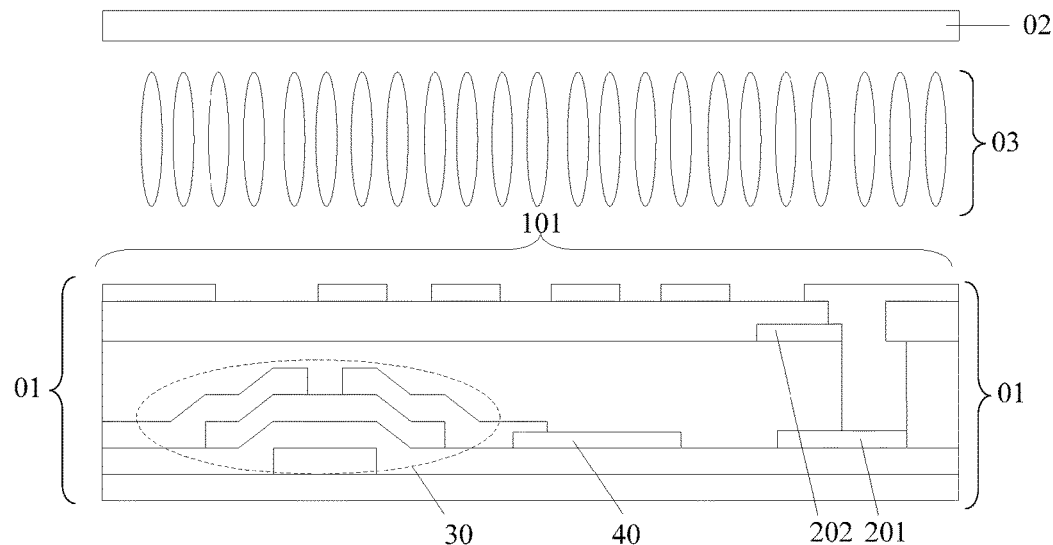
FIG. 6 is a first structural schematic diagram of a touch display panel provided in the embodiments of the present disclosure.

The embodiments of the present disclosure further provide a touch display panel. As shown in FIG. 6, the touch display panel includes the above array substrate 01, optionally a second substrate 02, and the liquid crystal layer 03 arranged between the array substrate 01 and the second substrate 02. The array substrate 01 and the second substrate 02 are oppositely arranged to form a cell.

An operation principle of the implementation of the display function and the touch function performed by the touch display panel in the time-division manner provided in the embodiments of the present disclosure is specifically illustrated by taking a typical 60 Hz scanning frequency as an example. A scanning frequency of the touch display panel is set to the typical value of 60 Hz, that is, a time duration of each frame is about 16.67 ms; however, a width of a driving pulse for the gate electrode of the TFT 30 in the touch display panel is narrow, a time duration needed for outputting an image frame in a row-by-row manner is often shorter than a standard time duration set for each image frame (i.e., 16.67 ms). Based on this, a certain time margin exists when the touch display panel displays an image. The time margin is not necessarily the same due to different pixels in each image frame, and an order of magnitude of the time margin is generally several milliseconds (ms). During this time margin, the touch display panel is in an idle state. The touch display panel of the embodiments of the present disclosure may uses this time margin as a touch sense time for the sub-electrode 101, thereby an operational timing of the touch sensing function may be separated from that of the image displaying function, so that the touch display panel may implement the displaying function and the sensing function.

Further, the embodiments of the present disclosure also provide a touch display device which includes the touch display panel and a circuit board. The circuit board further includes a driving IC connected with the touch electrode line 20. The driving IC is electrically connected with the touch electrode lines 20 through a pad arranged on the array substrate 01, thereby providing driving signals to the sub-electrodes 101 and receiving feedback signals.

The above touch display device may be any product or component having a displaying function, such as a liquid crystal display, a liquid crystal television, a digital frame, a mobile phone or a tablet computer.

Figure 7:
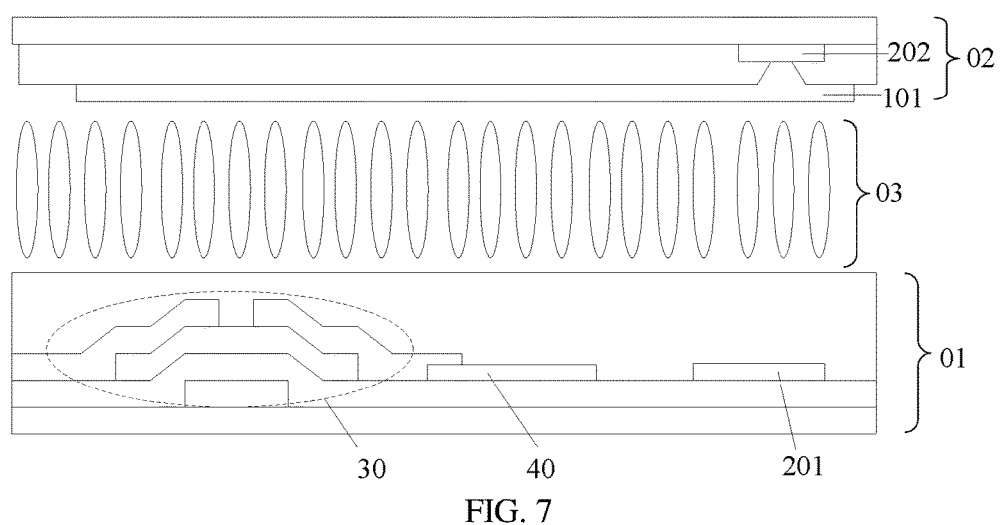
FIG. 7 is a second structural schematic diagram of a touch display panel provided in the embodiments of the present disclosure.

The embodiments of the present disclosure also provide a touch display panel. As shown in FIGS. 1 and 7, the touch display panel includes the array substrate 01 and the second substrate 02 that are oppositely arranged to form a cell. The array substrate 01 includes a plurality of first touch electrode lines 201 arranged on the a first base substrate, and the second substrate 02 includes the transparent electrode 10 and a plurality of second touch electrode lines 202 arranged on a second base substrate. The transparent electrode 10 includes a plurality of sub-electrodes 101 connected with the plurality of the second touch electrode lines 202 respectively. Each of the first touch electrode lines 201 corresponds to a respective one of the second touch electrode lines 202 in a one-to-one manner, and is electrically connected to the one of the second touch electrode lines 202 by conductive adhesive such as sealant doped with conductive golden balls. The projections of the first touch electrode line 201 and the second touch electrode line 202 are overlapped with each other.

It should be noted that, firstly, as known by a person skilled in the art, the array substrate 01 consists of a plurality of pixel units arranged in a matrix, and each of the pixel units includes at least three sub-pixel units. Each of the sub-pixel units includes a TFT 30 and a pixel electrode 40, wherein the TFT 30 includes a gate electrode, a gate insulation layer, an active layer, a source electrode and a drain electrode, and the pixel electrode 40 is connected with the drain electrode.

Because only the region where the pixel electrode 40 in each sub-pixel unit is located may be light-transmissible, i.e., the region where the pixel electrode 40 is located is a light-transmissible region. In view of this, because the first touch electrode lines 201 are generally made of a metal material, the first touch electrode lines 201 in the embodiments of the present disclosure are preferably located in the non-light-transmissible region, so as to increase the aperture ratio.

Secondly, each of the sub-electrodes 101 corresponds to a respective pair of first touch electrode line 201 and second touch electrode line 202 in a one-to-one manner. The pair of first touch electrode line 201 and second touch electrode line 202 is the one of the first touch electrode lines 201 and the one of the second touch electrode lines 202 corresponding to each other in a one-to-one manner.

Thirdly, the projections of the first touch electrode line 201 and the second touch electrode lines 202 on the first base substrate may be partially or completely overlapped with each other, which is not particularly defined herein.

In the touch display panel provided in the embodiments of the present disclosure, the first touch electrode line 201 and the second touch electrode line 202 are provided in parallel, such that a resistance of the touch electrode line 20 consisting of the first touch electrode line 201 and the second touch electrode line 202 may be decreased, thereby reducing signal delays and improving the touch performance of the touch display panel.

Optionally, at the display stage, the sub-electrodes 101 further function as a common electrode.

In the present disclosure, the display stage indicates a time period during which an image display function is implemented when the array substrate 01 is applied to a touch display panel; and the touch stage indicates a time period during which a touch function is implemented when the array substrate 01 is applied to the touch display panel. In a specific operation, a time-division driving mode (i.e., the display stage and the touch stage are driven separately) is used to the sub-electrodes 101. That is, at the display stage, the sub-electrodes 101 function as the common electrode, and corresponding voltages for implementing the image display function are applied to the sub-electrodes 101 and the pixel electrodes 40 to achieve the image display function; and at the touch stage, the sub-electrodes 101 function as the touch electrodes, and corresponding voltages for implementing the touch function are applied to the sub-electrodes 101, and at the same time, the pixel electrodes 40 do not work to avoid affecting the touch function.

Further optionally, as shown in FIG. 7, the one of the first touch electrode lines 201 and the source electrode and the drain electrode of the TFT 30 are arranged in the same layer. Alternatively, the one of the first touch electrode lines 201 and the gate electrode of the TFT 50 are arranged in the same layer. Such arrangement may reduce the number of patterning processes.

That is, the first touch electrode line 201, the source electrode and the drain electrode may be formed by one patterning process, and a data line connected with the source electrode may also be formed simultaneously, and the first touch electrode line 201 is parallel to the data line. Alternatively, the first touch electrode line 201 and the gate electrode may be formed by one patterning process, and a gate line electrically connected with the gate electrode may also be formed simultaneously, and the first touch electrode line 201 is parallel to the gate line.

Referring to FIG. 5, the second touch electrode line 202 includes a line portion 2011 and a convex portion 2012 connected with the line portion 2011; the sub-electrode 101 is electrically connected with the second touch electrode line 202 through the via hole corresponding to the convex portion 2012.

In the related arts, electrodes are typically connected by the lines only, a width of the lines 2011 is generally narrow, and thus an electrical connection may not be implemented through a via hole sometimes. In contrast, in the embodiments of the present disclosure, the electrical connection may always be implemented by providing the convex portion 2012 connected with the line portion 2011 and arranging the via hole above the convex portion 2012.

The embodiments of the present disclosure also provide a method for manufacturing an array substrate. Referring to FIG. 1, FIG. 2 and FIG. 4, the method includes: forming a transparent electrode 10 and touch electrode lines 20 on the base substrate, wherein the transparent electrode 10 includes a plurality of sub-electrodes 101, each of which is connected with a respective one of the touch electrode lines 20; each of the touch electrode lines 20 includes the first touch electrode line 201 and the second touch electrode line 202 arranged in different layers, and the projections of the first touch electrode line 201 and the second touch electrode line 202 on the base substrate are overlapped with each other.

By providing the first touch electrode line 201 and the second touch electrode line 202 in parallel, a resistance of the touch electrode line 20 consisting of the first touch electrode line 201 and the second touch electrode line 202 may be decreased, thereby reducing the signal delays and improving the touch performance of the touch display panel.

Optionally, the first touch electrode line 201, and the source electrode and the drain electrode of the TFT 30 may be formed by one patterning process, and the data line electrically connected with the source electrode may also be formed simultaneously, and the first touch electrode line 201 is parallel to the data line. Alternatively, the first touch electrode line 201 and the gate electrode of the TFT 30 may be formed by one patterning process, and the gate line electrically connected with the gate electrode may also be formed simultaneously, and the first touch electrode line 201 is parallel to the gate line. Such arrangement may reduce the number of patterning processes.

Optionally, referring to FIG. 5, each of the first touch electrode line 201 and the second touch electrode line 202 include the line portion 2011 and the convex portion 2012 connected with the line portion 2011, wherein each of the sub-electrodes 101 is electrically connected with the first touch electrode line 201 and/or the second touch electrode line 202 through the via hole corresponding to the convex portion 2012.

For example, referring to FIG. 4, the method for manufacturing the array substrate may include the following steps:

S101: forming sequentially on the base substrate the gate electrode, the gate insulation layer, the semiconductor active layer, and the pixel electrode 40;

S102: on the basis of S101, forming the source electrode, the data line electrically connected with the source electrode, the drain electrode electrically connected with the pixel electrode 40, and the first touch electrode line 20 which is parallel to the data line and arranged in the non-light-transmissible region; wherein referring to FIG. 5, the first touch electrode line 201 includes the line portion 2011 and the convex portion 2012 connected with the line portion 2011.

S103: on the basis of S102, forming a first insulation layer;

S104: on the basis of S103, forming the second touch electrode line 202, wherein, referring to FIG. 5, the second touch electrode line 202 includes the line portion 2011 and the convex portion 2012 connected with the line portion 2011; wherein the projections of the first touch electrode line 201 and the second touch electrode line 202 on the substrate are overlapped with each other, and a part of the convex portion 2012 of the first touch electrode line 201 is not covered by the convex portion 2012 of the second touch electrode line 202;

S105: on the basis of S104, forming a second insulation layer, and etching the first insulation layer and the second insulation layer to form a via hole by a patterning process, wherein the via hole exposes the above part of the convex portion 2012 of the first touch electrode line 201 and the convex portion 2012 of the second touch electrode line 202;

S106: on the basis of S105, forming the subs-electrode 101, wherein the sub-electrode is electrically connected with the convex portion 2012 of the first touch electrode line 201 and the convex portion 2012 of the second touch electrode line 202 through the via hole, respectively.

The above descriptions are only preferred embodiments of the present disclosure. However, the protection scope of the present disclosure is not limited thereto. A person skilled in the art may make further modifications and improvements without departing from the principle and spirit of the present disclosure, and these modifications and improvements shall also fall within the scope of the present disclosure.

What is claimed is:

1. An array substrate, comprising:
    a transparent electrode and a plurality of touch electrode lines arranged on a base substrate,
    wherein the transparent electrode comprises a plurality of sub-electrodes, the plurality of sub-electrodes are connected with the plurality of touch electrode lines respectively, each of the plurality of touch electrode lines comprises a first touch electrode line and a second touch electrode line arranged in different layers, and a projection of the first touch electrode line onto the base substrate completely coincides with a projection of the second touch electrode line onto the base substrate;
    each of the first touch electrode line and the second touch electrode line comprises a line portion and a convex portion that is connected with the line portion and arranged in a same plane as the line portion, a shape of the line portion of the first touch electrode line is same as a shape of the line portion of the second touch electrode line, and a shape of the convex portion of the first touch electrode line is same as a shape of the convex portion of the second touch electrode line; and
    the sub-electrode is electrically connected with the first touch electrode line, the second touch electrode line, or the first touch electrode line and the second touch electrode line through merely one via hole corresponding to the convex portion.

2. The array substrate according to claim 1, further comprising a plurality of Thin Film Transistors (TFTs) and a plurality of pixel electrodes,
    wherein the plurality of pixel electrodes are electrically connected with drain electrodes of the plurality of TFTs respectively; and
    at a display stage, the sub-electrodes further function as a common electrode.

3. The array substrate according to claim 2, wherein
    the first touch electrode line and a source electrode and the drain electrode of the TFT are arranged in a same layer; or
    the first touch electrode line and a gate electrode of the TFT are arranged in the same layer.

4. The array substrate according to claim 1, wherein
    both the first touch electrode line and the second touch electrode line are located in a non-light-transmissible region.

5. The array substrate according to claim 1, wherein
    the sub-electrodes correspond to the plurality of touch electrode lines respectively in a one-to-one manner.

6. The array substrate according to claim 1, wherein
    the second touch electrode line is arranged at a location between the first touch electrode line and the sub-electrode, the sub-electrode is arranged at a location away from the base substrate, and the first touch electrode line is arranged at a location close to the base substrate.

7. A touch display panel comprising the array substrate according to claim 1.

8. The touch display panel according to claim 7, wherein the array substrate further comprises a plurality of Thin Film Transistors (TFTs) and a plurality of pixel electrodes,
    wherein the plurality of pixel electrodes are electrically connected with drain electrodes of the plurality of TFTs respectively; and
    at a display stage, the sub-electrodes further function as a common electrode.

9. The touch display panel according to claim 8, wherein
    the first touch electrode line and a source electrode and the drain electrode of the TFT are arranged in a same layer; or
    the first touch electrode line and a gate electrode of the TFT are arranged in the same layer.

10. The touch display panel according to claim 7, wherein
    the first touch electrode line and the second touch electrode line of the touch electrode line corresponding to the sub-electrode are electrically connected with each other via the sub-electrode.

11. The array substrate according to claim 1, wherein
    the first touch electrode line and the second touch electrode line of the touch electrode line corresponding to the sub-electrode are electrically connected with each other via the sub-electrode.

12. A method for manufacturing an array substrate, comprising:
    forming a transparent electrode and a plurality of touch electrode lines on a base substrate,
    wherein the transparent electrode comprises a plurality of sub-electrodes, and the plurality of sub-electrodes are connected with the plurality of touch electrode lines respectively;
    each of the plurality of touch electrode lines comprises a first touch electrode line and a second touch electrode line arranged in different layers, and a projection of the first touch electrode line onto the base substrate completely coincides with a projection of the second touch electrode line onto the base substrate;
    each of the first touch electrode line and the second touch electrode line comprises a line portion and a convex portion that is connected with the line portion and arranged in a same plane as the line portion, a shape of the line portion of the first touch electrode line is same as a shape of the line portion of the second touch electrode line, and a shape of the convex portion of the first touch electrode line is same as a shape of the convex portion of the second touch electrode line; and
    the sub-electrode is electrically connected with the first touch electrode line, the second touch electrode line, or the first touch electrode line and the second touch electrode line through merely one via hole corresponding to the convex portion.

13. The method according to claim 12, wherein
    the first touch electrode line and a source electrode and a drain electrode of a Thin Film Transistor (TFT) are formed through a same patterning process; or
    the first touch electrode line and a gate electrode of the TFT are formed through the same patterning process.

* * * * *